Dec. 11, 1934.   J. ENGL   1,984,208
SOUND LIGHT RAY INTENSITY CONTROL
Filed Oct. 2, 1930
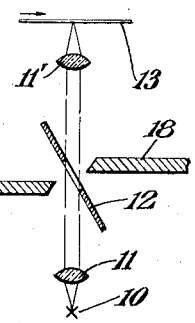
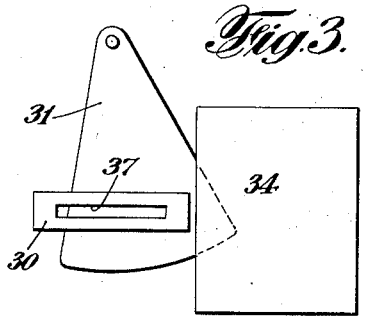
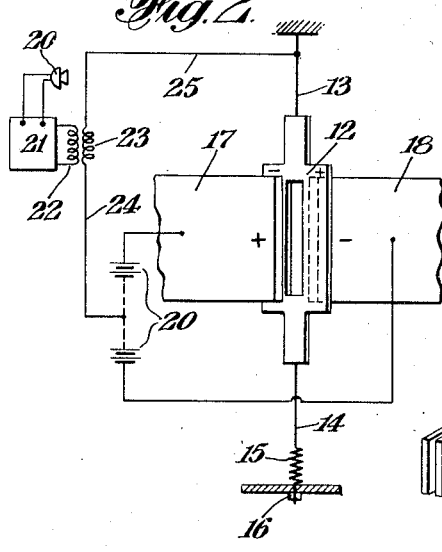
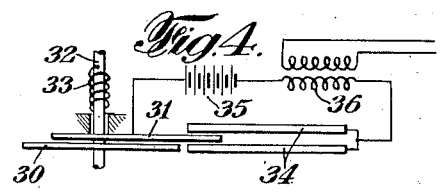
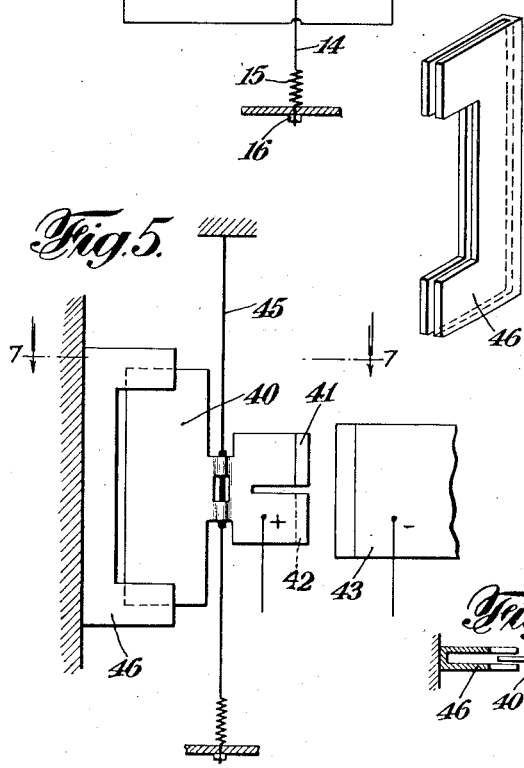
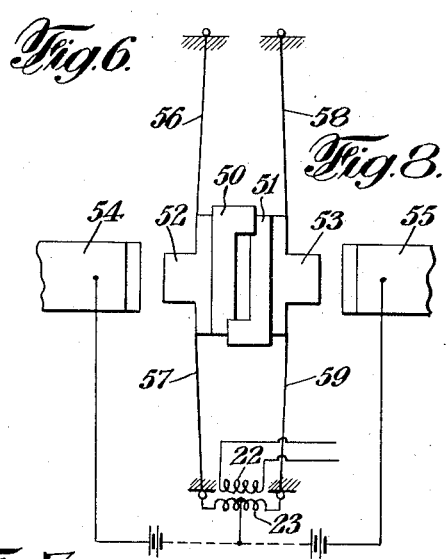
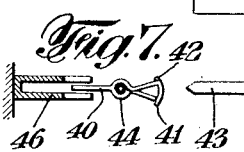
INVENTOR
Josef Engl
BY
Ward Crosby + Neal
ATTORNEYS Patented Dec. 11, 1934

1,984,208

UNITED STATES PATENT OFFICE 1,984,208

SOUND LIGHT RAY INTENSITY CONTROL

Josef Engl, Berlin-Charlottenburg, Germany, assignor to Engl Products Corporation, New York, N. Y., a corporation of New York Application October 2, 1930, Serial No. 485,908
In Germany July 10, 1930

1 Claim. (Cl. 88—61)

This invention relates to means for controlling the intensity of a beam of light by electrical means under control of a transmitter.

Among the objects of this invention are the provision of mechanism for controlling the intensity of a light beam by electrostatic forces under control of a transmitter.

Other objects of this invention will be apparent from the following description of several embodiments of the invention when taken in connection with the drawing, in which Fig. 1 is a transverse section of mechanical parts of one embodiment;

Fig. 2 is a side view of said mechanical parts and one form of wiring system employed;

Fig. 3 is a side view of another embodiment;

Fig. 4 shows an edge view of Fig. 3 together with a wiring system that may be employed;

Fig. 5 shows another embodiment;

Fig. 6 shows one of the elements in Fig. 5 in perspective;

Fig. 7 is a horizontal section on the line 7—7 of Fig. 5; and

Fig. 8 shows another modification.

In many of the known systems heretofore employed use is made of an oscillograph which involves a reflecting surface and which when under control of a voice frequency current causes a beam of light directed thereto to be reflected on to different positions on the film. It has been found, however, that it is hard to make these systems sufficiently sensitive and responsive because of the limit that is imposed upon them by their weight resulting from the particular construction involved. Oscillographs also require a considerable amount of current the necessity for which I avoid by the use of the mechanism disclosed.

In Fig. 1 there is shown a light source 10, a lens 11, a plate 12 provided with a light slit in the path of the beam, a concentrating lens 11', and a film 13.

As shown in Fig. 2, the plate 12 is suspended by thin wires 13 and 14 from any suitable parts of a frame housing the device. The wire 14 may be coiled to form a spring 15 and the end of the wire may be extended through the frame where it may be provided with an adjusting nut 16 whereby the tension on the wires 13 and 14 may be increased or decreased and the sensitivity of the plate 12 may be regulated.

Cooperating with the plate 12 are two electrodes 17 and 18 which are connected to a source of potential 20, as indicated in Fig. 2, so that these electrodes are normally charged with opposite polarities tending to rotate the plate 12 into a position in which the force exerted by the charges on the electrodes 17 and 18 and the plate 12 will be counterbalanced by the spring 15 which is constructed to urge the plate 12 into a neutral position.

It will thus be seen that if there is any change in the electrostatic condition of this system that the plate 12 will move in one or the other direction depending upon the character of the charge that may be superinduced upon the plate 12. This construction permits the use of a very thin plate 12 which, because of its small weight, has very low inertia and is therefore very sensitive.

For the purpose of recording sound I employ any ordinary form of transmitter 20, and amplifier 21, and in this system I include the primary coil 22 of a transformer. The other coil 23 of the transformer I connect to the wire 13 by a wire 25, and to the source of potential by means of a wire 24 connected at a point of symmetry to the source of potential.

When sound is produced in front of the transmitter it will set up current frequencies in the coil 22 which in turn induce voice frequencies in the coil 23 which in turn imposes positive and negative charges on the plate 12. As these charges are imposed on the plate 12 electrostatic forces between the electrodes 17 and 18 and the plate 12 will be changed and the plate will oscillate in accordance with the voice frequencies initially set up in the transmitter and set up in the circuits 23, 24 and 25 by induction in the transformer.

As the plate 12 oscillates it will permit a larger or smaller cross sectional area of the beam of light to strike the film.

Instead of using the form of mechanism shown in Figs. 1 and 2, in which I employ a heterostatic wiring system, I may use the mechanism shown in Fig. 3 with which I may use an idiostatic wiring system such as shown in Fig. 4.

The construction shown in Fig. 3 includes a stationary slitted member 30, a movable shutter electrode 31 which is preferably mounted on a pintle 32 which may be spring-pressed as by spring 33 to normally move to its extreme left hand position when viewed as shown in Fig. 3.

Cooperating with the electrode 31 is a pair of stationary electrodes 34 between which the electrode 31 operates. The positive pole of the source of potential 35 may be connected to the electrode 31 and the negative pole of the source of potential 35 may be connected through a secondary coil 36 of a transformer to the stationary electrodes 34. This modification includes the arrangement of the transmitter, amplifier and the primary coil of the transformer, as in Fig. 2.

When sound enters the transmitter voice frequency currents will cause corresponding oscillations in the secondary coil 36 of the transformer and vary the electrostatic charges on the plates 34 which will cause the electrode 31 to be moved in opposition to the spring 33 or under the influence of the spring 33 as the case may be to permit more or less of the beam to pass through the slit 37 of the slitted plate 30.

In Fig. 5 I have shown another form of device which includes a movable slit member 40 secured to a long thin wire, the tension of which may be regulated as in the case of Fig. 2 which may or may not include a spring, as desired. The right hand end of the movable slit member 40 may be forked as shown, the ends 41 and 42 of the fork being preferably bent in opposite directions, Fig. 7, and in arcuate form to form a systematic arrangement with respect to the knife edge of a fixed electrode 43. The center of the plate may be cut and pressed to form a tongue 44 which when bent into the position shown in Fig. 7 holds the slit member 40 in position on the supporting wire 45. As indicated in Fig. 5, one of the terminals of the source of potential may be connected to the plate 40 and the other to the plate 43 and the varying electrostatic forces acting between these plates will tend to oscillate the plate 40 back and forth as is understood.

The plate 40 preferably cooperates with a U-plate 46 secured to the frame of the device which may be of insulating material or of conducting material insulated from the frame. The plates 40 and 46 define a slit for the light beam and the width of this slit is determined by the forces acting between the electrode 43 and the plate 40. It is to be understood, of course, that in certain instances it may not be necessary to use the plate 46 as the plate 40 can be suspended in such a manner as to preclude any great amount of angular oscillation.

In the modification shown in Fig. 8, I have shown two slit members 50 and 51 which are preferably of non-conducting material and which have flanges overlapping as shown. These members 50 and 51 are carried by metal members 52 and 53 which in this modification constitute electrodes cooperating respectively with fixed electrodes 54 and 55 which may also be provided with knife edges. In this modification the members 52 and 53 are suspended by wires 56, 57, 58 and 59 which may be suitably supported in frame members as indicated.

The positive pole of the source of potential may be connected to the electrode 54 and the negative source to the electrode 55. The point of symmetry of the potential may be connected to the medial point of a secondary coil 23, the terminals of which are connected by the wires 57 and 59 to the movable electrodes 52 and 53. The transmitter, amplifier and general arrangement of Fig. 8 including the primary coil 22 of the transformer may be the same as in Fig. 2. The operation of this modification is substantially the same as that shown in Fig. 2. When sound enters the transmitter it causes currents to be set up in the coil 22, the resultant electrical variations set up in the coil 23 superinducing positive or negative charges on the movable electrodes 52 and 53 thus changing the electrostatic conditions between the pairs of cooperating electrodes 52, 54 and 53, 55 which cause the electrodes 52 and 53 to move toward and away from each other causing a like movement of the plates 50 and 51 to control the opening formed by these plates.

While I have described my invention as a means for controlling the intensity of a beam of light, as will be the case if the light transmitted through the slit in any of the modifications is focused to a point, it will also be understood that I have made provision for increasing the cross sectional area of the beam transmitted so that the image produced on the film may be of varying width instead of increased intensity.

What is claimed is:

In a light valve, the combination of a diaphragm comprising two cooperating members each of which is provided with a portion of insulating material, said portions cooperating to define a slit, each member being further provided with an electrode, relatively long thin wires for supporting said electrodes for movement toward and away from each other, and a pair of fixed electrodes cooperating with said movable electrodes.

JOSEF ENGL.